(12) United States Patent
Smith et al.

(10) Patent No.: US 6,392,141 B1
(45) Date of Patent: May 21, 2002

(54) ELECTRICAL ENCLOSURE HAVING DEDICATED WIRING COMPARTMENT

(75) Inventors: David Leon Smith; Ronald Lee Robinson; Jerome Mark Visocky, all of Murfreesboro; Mitchell Whitson Lampley, Thompson Station, all of TN (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/657,687

(22) Filed: Sep. 8, 2000

(51) Int. Cl.⁷ .................................................. H02G 3/08
(52) U.S. Cl. ..................... 174/50; 174/65 R; 174/58; 220/3.2
(58) Field of Search ................................ 174/50, 65 R, 174/68.1, 68.3, 58, 53, 59, 48, 57, 17 R; 220/3.3, 3.94, 241, 3.5, 3.6, 3.7, 3.8, 3.2; 439/131; 52/220.1

(56) References Cited

U.S. PATENT DOCUMENTS

| | | | | |
|---|---|---|---|---|
| 3,967,165 A | * | 6/1976 | Olashaw et al. | 174/16 R |
| 4,630,886 A | * | 12/1986 | Lauriello et al. | 350/96.2 |
| 5,574,251 A | * | 11/1996 | Sevier | 174/50 |
| 5,626,404 A | * | 5/1997 | Kelley et al. | 312/198 |
| 5,982,610 A | * | 11/1999 | Crawford et al. | 174/65 R |
| 6,040,976 A | * | 3/2000 | Bruner et al. | 361/611 |
| 6,175,079 B1 | * | 1/2001 | Johnston et al. | 174/50 |
| 6,205,017 B1 | * | 3/2001 | Wilkie, II et al. | 361/605 |
| 6,206,494 B1 | * | 3/2001 | Benner et al. | 174/50 |

* cited by examiner

*Primary Examiner*—Dean A. Reichard
*Assistant Examiner*—Angel R. Estrada
(74) *Attorney, Agent, or Firm*—David R. Stacey; Larry T. Shrout; Larry I. Golden

(57) ABSTRACT

An electrical enclosure having continuous front accessible dedicated wiring compartments. The dedicated wiring compartments provide the installer with easily accessible front wiring compartments. Each dedicated wiring compartment contains wiring for a specific function. The dedicated wiring compartments are configured to provide a continuous front accessible wiring compartment for multiple enclosures installed immediately adjacent one another. Horizontal frame members of the electrical enclosure provide a significant part of each dedicated wiring compartment.

15 Claims, 7 Drawing Sheets

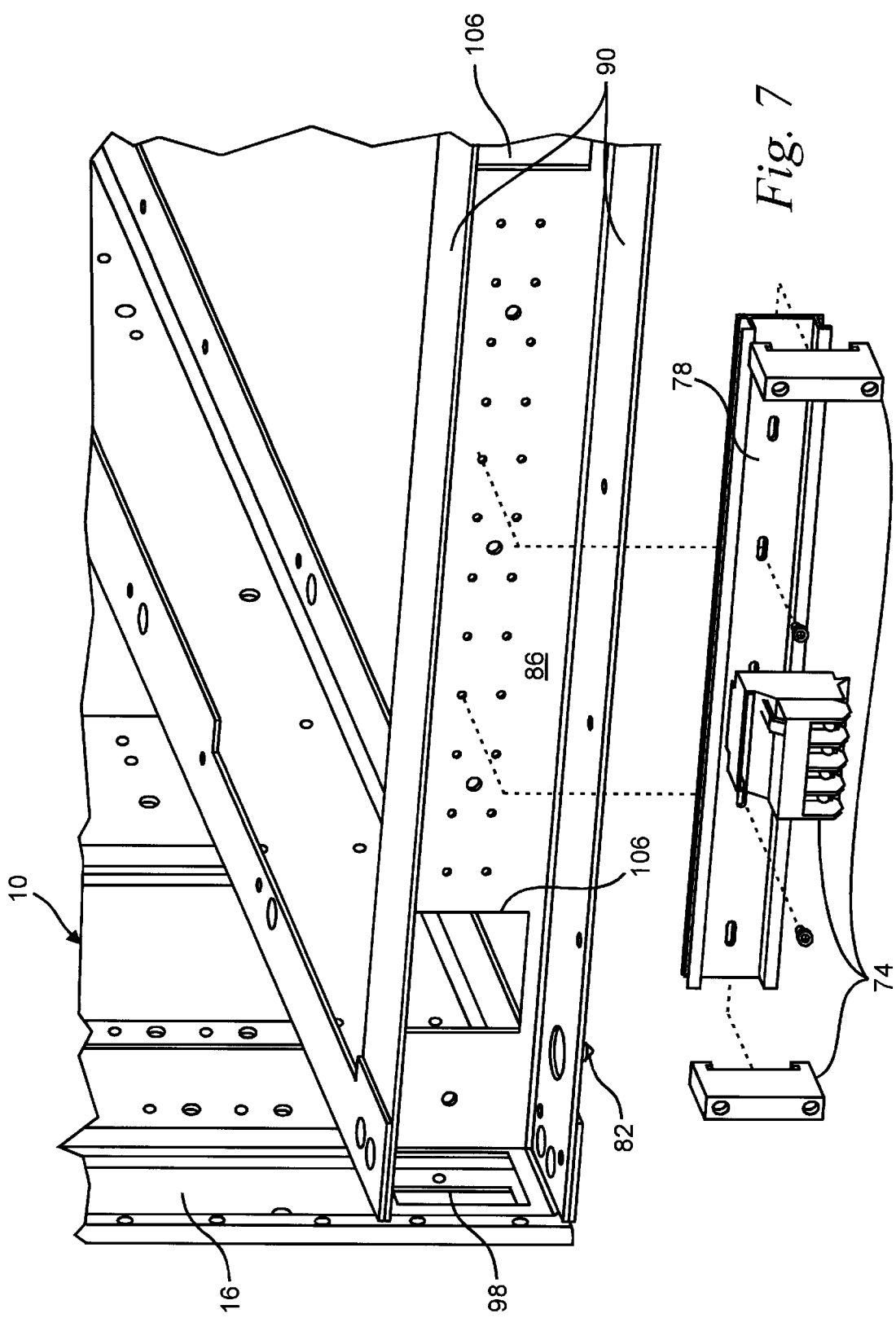

US 6,392,141 B1

ELECTRICAL ENCLOSURE HAVING DEDICATED WIRING COMPARTMENT

FIELD OF THE INVENTION

The present invention relates to the field of electrical enclosures, and particularly to segregated front access wiring compartments for dedicated function wiring.

BRIEF DESCRIPTION OF THE DRAWINGS

FIG. 7 illustrates the components of the lower front access wiring compartment of FIG. 1 with respect to the electrical enclosure frame.

Figure 1:
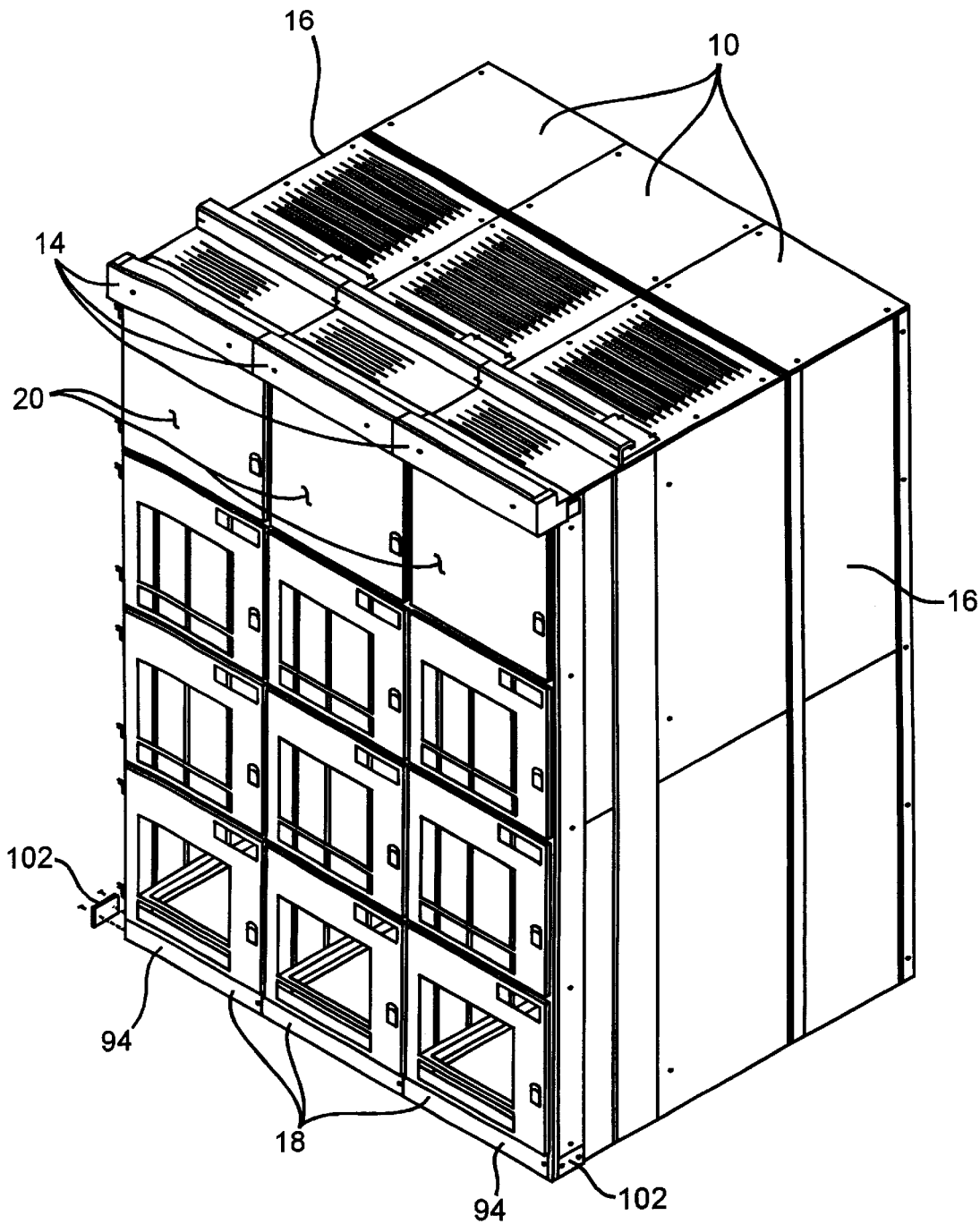
FIG. 1 is an isometric view of a switchgear or switchboard enclosure including an integral front access wiring compartment manufactured in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates a typical switchgear or switchboard installation in which multiple switchgear or switchboard enclosures, each generally indicated by reference numeral 10, are assemble together as a unit. Each enclosure 10 includes an upper wiring compartment 14, extending between two parallel side walls 16 along the top of the enclosure 10 and lower wiring compartment 18 extending between the two parallel side walls 16 along the bottom of the enclosure 10. Each of the upper and lower wiring compartments, 14 and 18, respectively, provide the customer with easy access to internal wiring from the front of the switchgear or switchboard enclosure 10 to facilitate electrical connections during installation. The upper and lower wiring compartments, 14 and 18, respectively, are also configured to provide a continuous front access wiring compartment along the top and bottom front surface 20 of single or multiple switchgear or switchboard enclosure 10 installations. Each of the wiring compartments, 14 and 18 are dedicated to a specific function, for example one of the compartments, 14 or 18, can provide protection for control wiring and the other of the compartments, 14 or 18, can provide protection for communications wiring. Since the upper wiring compartment 14 is spaced apart from the lower wiring compartment 18 by the height of the enclosure 10, any minimum spacing between control and communications wiring required by local or national standards is easily met.

Figure 2:
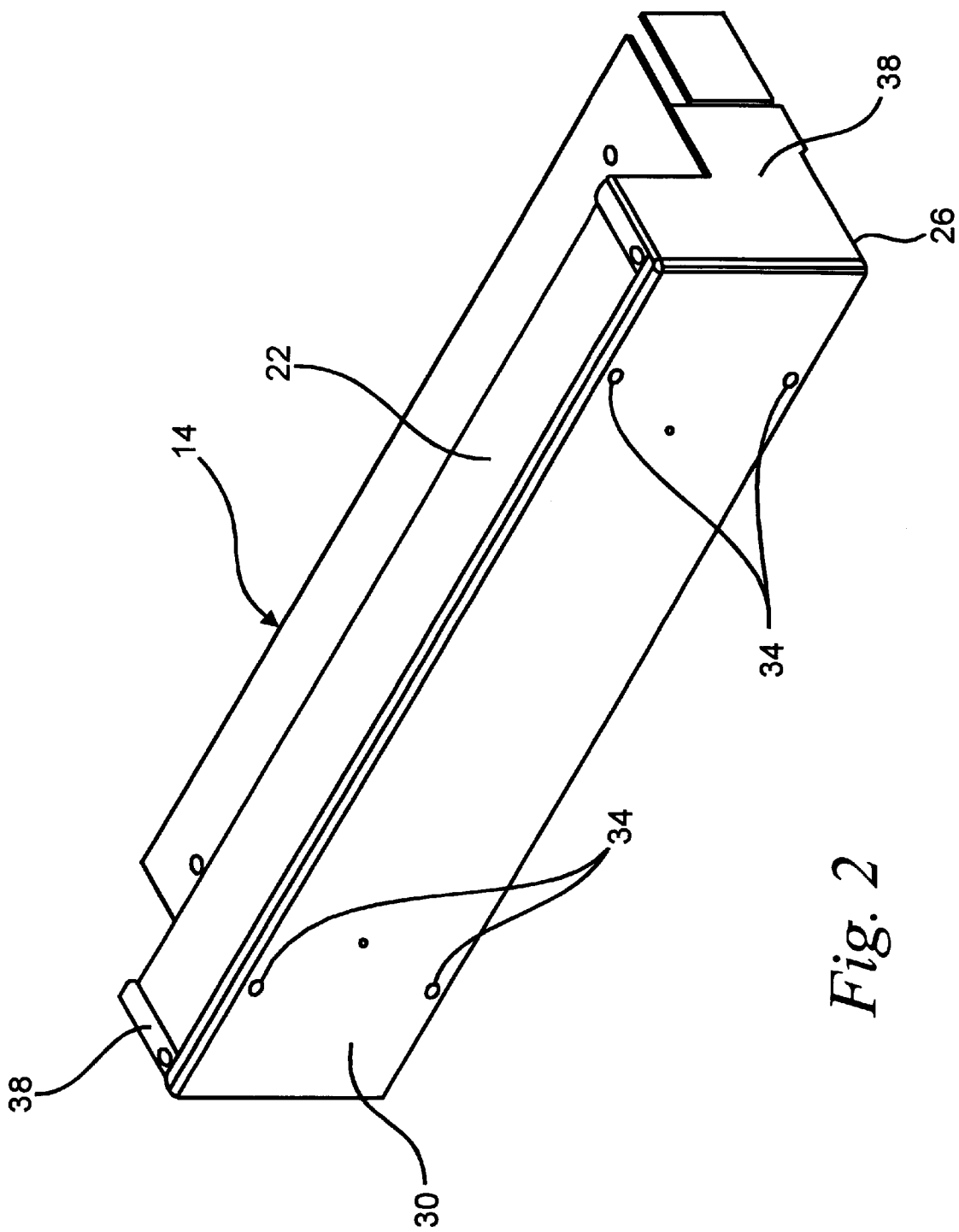
FIG. 2 is an isometric view of an upper front access wiring compartment manufactured in accordance with the present invention.

FIG. 2 illustrates a first embodiment of an upper wiring compartment 14, manufactured in accordance with the present invention. The upper wiring compartment 14 includes a top portion 22, a bottom portion 26 and a removable cover 30. The cover 30 can be attached to the top and bottom portions, 22 and 26, respectively, by fastening hardware 34, such as screws, ¼ turn fasteners or similar fastening means. A closing plate 38 is attached to each terminating end of the upper wiring compartment 14 to close off the wiring compartment 14.

Figure 3:
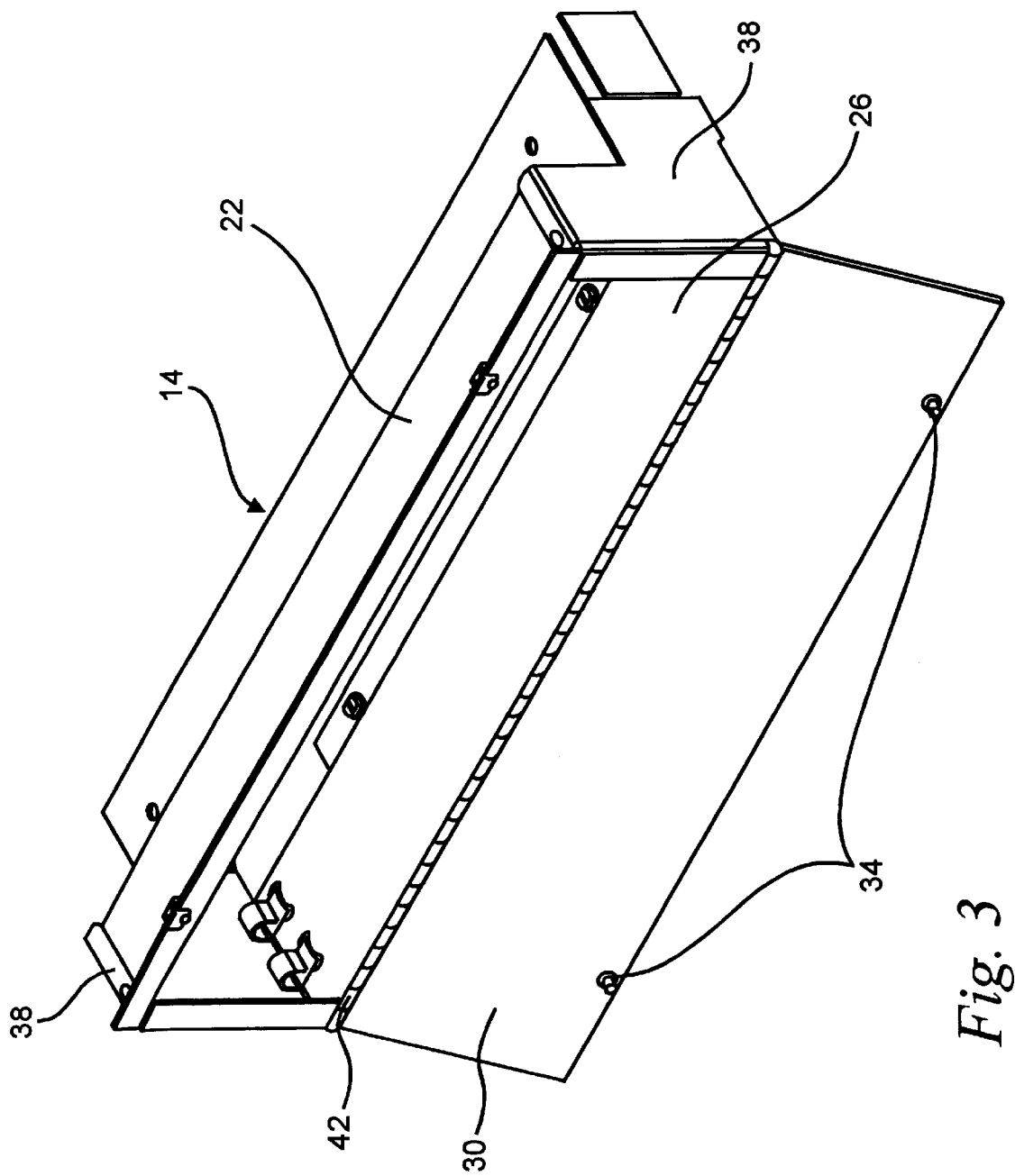
FIG. 3 is an isometric view of an upper front access wiring compartment with hinged cover manufactured in accordance with the present invention.

FIG. 3 illustrates a second embodiment of the upper wiring compartment 14 in which the cover 30 is attached to the compartment bottom 26 by one or more hinges 42. The cover 30 is again held in the closed position by fastening means 34 such as screws, ¼ turn fasteners or similar latching means. The hinge 42 is shown attached to the compartment bottom 26, however, the hinge 42 could be attached to the compartment top 22.

Figure 4:
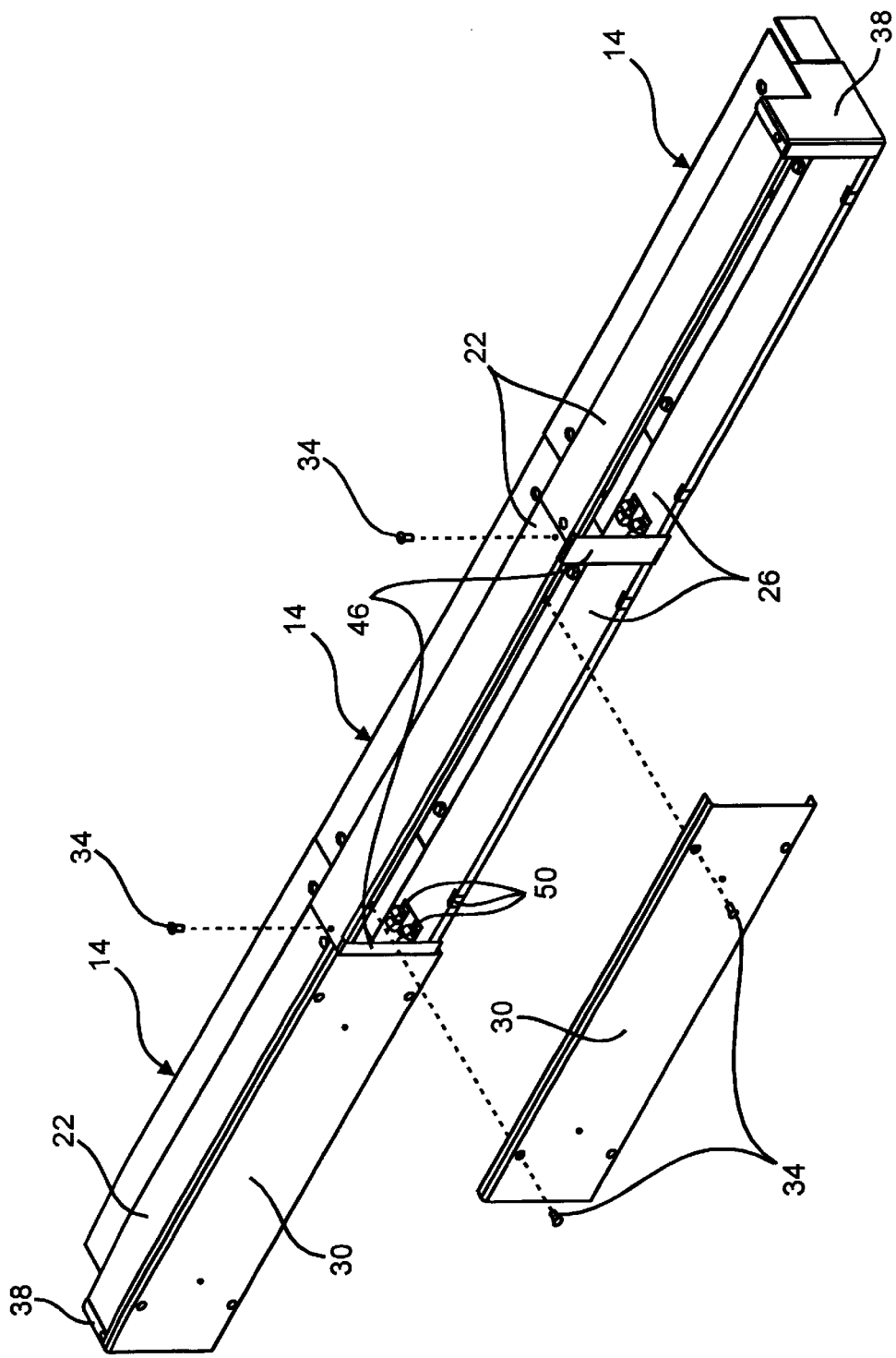
FIG. 4 is an isometric view of three upper front access wiring compartments as assembled for multiple switchgear or switchboard enclosure installations.

FIG. 4 illustrates three upper wiring compartments 14 as assembled for a multiple switchgear or switchboard enclosure 10 installation. In multiple enclosure installations, adjoining upper wiring compartments 14 are connected at the front by rabbets 46. These rabbets 46 provide mechanical support at the open side of the compartment 14, electrical continuity between the adjacent wiring compartments 14 and prevent the ingress of foreign objects between the adjacent covers 30. Each rabbet 46 is attached to each of its associated adjacent wiring compartments 14 by fasteners 34 such as screws. It is common practice to provide some form of wire abrasion protection 50 when screw threads are exposed inside a wiring compartment 14. Abrasion protection 50 is provided by commercially available products, such as shielded nuts or plastic thread covers.

Figure 5:
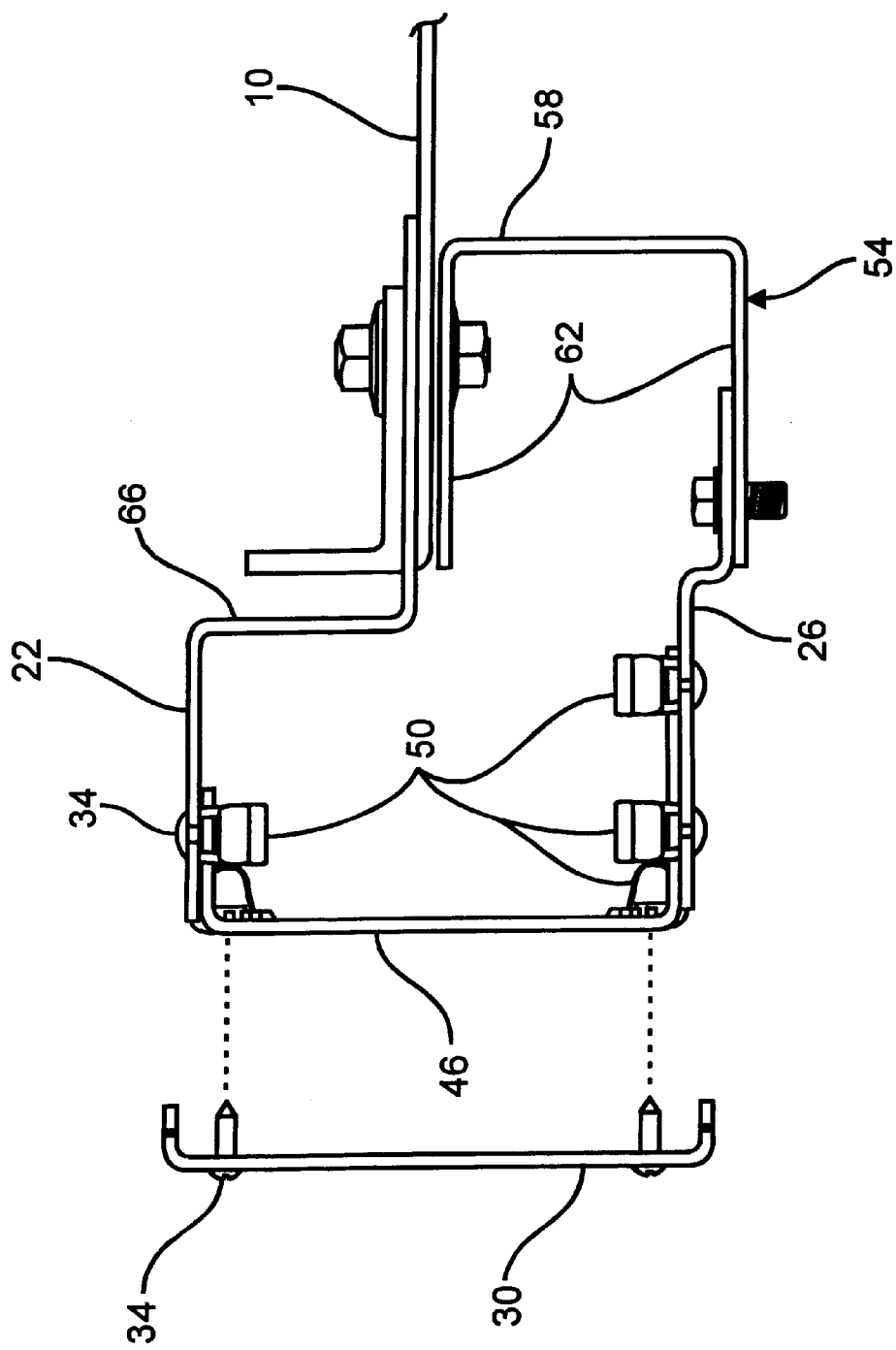
FIG. 5 is a cross-sectional view of the upper front access wiring compartment of FIG. 4.

FIG. 5 illustrates in cross-section the upper wiring compartment 14 of FIG. 4 assembled to an upper horizontal-frame-member 54 of the switchgear or switchboard enclosure 10. The frame member 54 defines a U-shaped channel having a web 58 intermediate two generally parallel legs 62. The horizontal-frame-member 54 extends longitudinally along the top of the enclosure 10 and is positioned such that the web 58 lies in a generally vertical plane, thus forming a back wall of the upper wiring compartment 14. The top 22 of the upper wiring compartment 14 is attached to one of the two parallel legs 62 and bottom 26 is attached to the other of the two parallel legs 62. As can be seen more clearly in this cross-sectional view, the top 22 is generally Z-shaped in cross-section such that a mounting surface 66 is defined.

Figure 6:
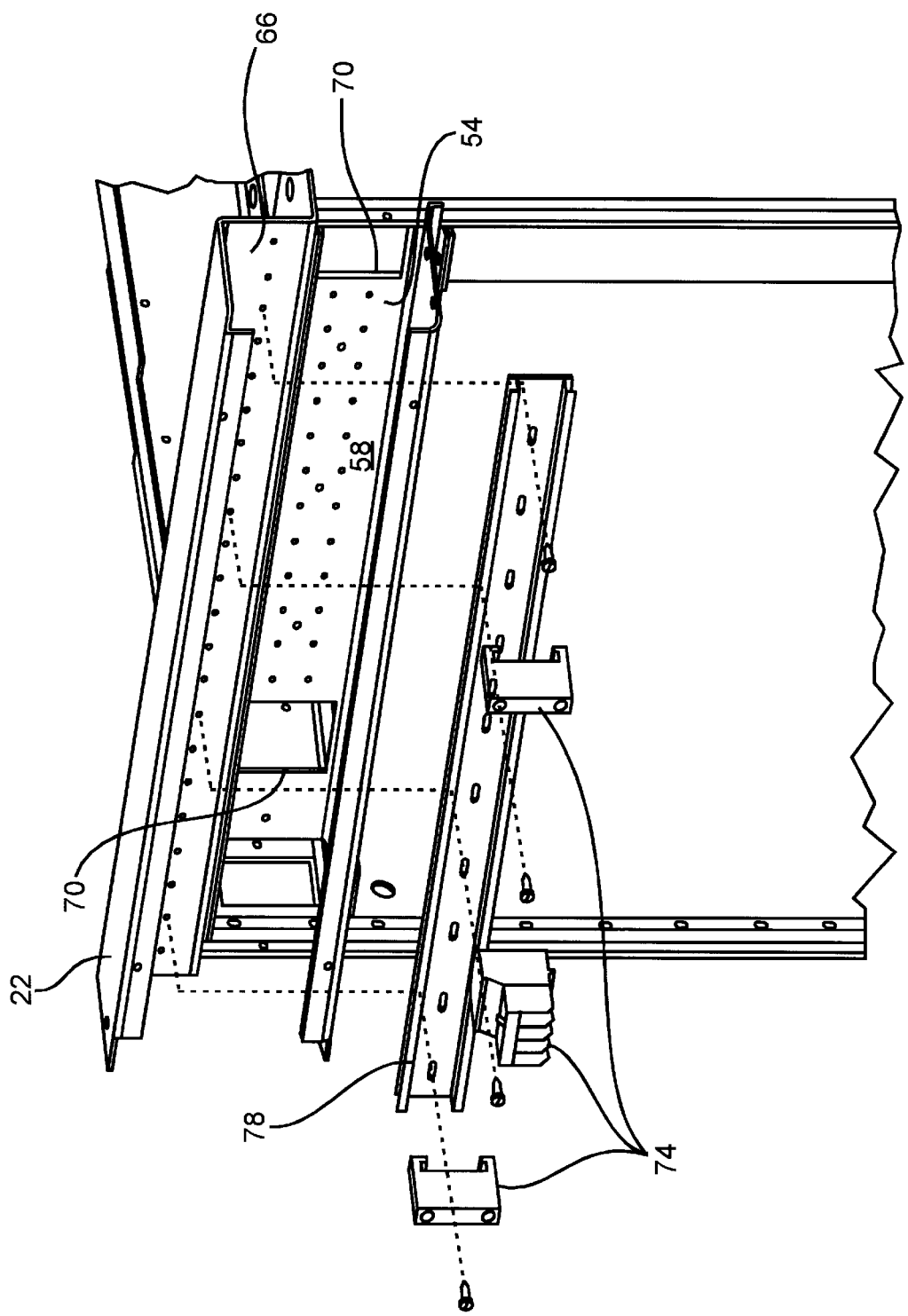
FIG. 6 illustrates the components of the upper front access wiring compartment of FIG. 1 with respect to the electrical enclosure frame.

FIG. 6 illustrates in more detail the upper wiring compartment 14, the horizontal frame member 54 and other elements of the invention not previously discussed. As can be seen in this view, the web 58 defines one or more apertures 70 through which internal wiring (not shown) from inside the switchgear or switchboard can pass into the upper wiring compartment 14. Wiring terminations 74, such as terminal blocks or plug-in type receptacles, can be directly mounted on the mounting surface 66 of the top 22, or on a mounting rail 78 that is attached to the mounting surface 66. The internal switchgear or switchboard wiring can be pre-terminated on the wiring terminations 74 at the factory, thus providing fast and simple connections to customer supplied external wiring during installation of the switchgear or switch board device.

FIG. 7 illustrates in more detail, elements of the lower wiring compartment 18. The lower wiring compartment 18 is defined by a lower horizontal-frame-member 82 of the switchgear or switchboard enclosure 10. The lower horizontal-frame-member 82 is generally identical to the upper horizontal-frame-member 54, in that it defines a generally U-shaped channel having a web 86 intermediate two generally parallel sides 90. The lower horizontal-framemember 82 extends longitudinally along the bottom of the enclosure 10. It is positioned such that the web 86 forms a back wall of the lower wiring channel 18, and the two parallel sides 90 form the top and bottom of the lower wiring channel 18. As shown best in FIG. 1, a cover 94 is attached to the lower wiring compartment 18 by means similar to that described above for attaching the cover 30 to the upper wiring compartment 14. An opening 98 (FIG. 7) is provided in the enclosure 10 at each end of the lower wiring compartment 18 to provide a continuous lower wiring compartment 18 in multiple switchgear or switchboard enclosure 10 installations. Closing plates 102 (FIG. 1), for closing the openings 98, are provided at each terminating end of the lower wiring compartment 18. Referring again to FIG. 7, the web 86 defines one or more apertures 106 through which internal wiring (not shown) from inside the switchgear or switchboard can pass into the lower wiring compartment 18. Wiring terminations 74, such as terminal blocks or plug-in type receptacles, can be directly mounted on the web 86 of the lower horizontal-frame-member 82, or on a mounting rail 78 that is attached to the web 86. The internal switchgear or switchboard wiring can be preterminated on the wiring terminations 74 at the factory, thus providing fast and simple connections to customer supplied external wiring during installation of the switchgear or switch board device.

During the installation of the switchgear or switchboard device, the installer will provide electrical conduit or other suitable wire management devices (not shown) to protect the user supplied wiring. These wire management devices can be connected directly to the closing plates, 38 and/or 102, or commercially available junction boxes can be attached to the sides of the enclosure 10 at one or both of the terminating ends of the wiring compartments 14 and/or 18.

We claim:

1. An electrical enclosure having dedicated wiring compartments, said enclosure comprising:
   a structural frame supporting the enclosure;
   a first horizontal-frame-member extending between two generally parallel side walls of the enclosure and defining a portion of a first dedicated wiring compartment;
   a second horizontal-frame-member extending between said two generally parallel side walls of the enclosure and defining a second dedicated wiring compartment.

2. The electrical enclosure of claim 1, wherein said first horizontal-frame-member is positioned along the top of the enclosure and said second horizontal-frame member is positioned along the bottom of the enclosure.

3. The electrical enclosure of claim 1, wherein said first and second horizontal-frame-members are generally U-shaped in cross-section such as to define a web intermediate two generally parallel legs, said first and second horizontal-frame-members being positioned such that said webs lie in a generally vertical plane and said parallel legs extend toward a front of the electrical enclosure, said webs of said first and second horizontal frame members forming a wall between the interior of the electrical enclosure and said first and second dedicated wiring compartments respectively, each said web further defining openings for the passage of wiring from within the enclosures into said first or second dedicated wiring compartment.

4. The electrical enclosure of claim 3, wherein said first dedicated wiring compartment further includes a top, a bottom and a cover, said top being attached to an upper one of said parallel legs of said first horizontal-frame-member and said bottom being attached to a lower one of said parallel legs of said first horizontal-frame-member, said cover selectively closing a longitudinal opening defined between said top and said bottom.

5. The electrical enclosure of claim 4, wherein said top further includes a mounting surface on which wire terminating devices can be mounted.

6. The electrical enclosure of claim 3, wherein said second dedicated wiring compartment further includes a cover for selectively closing a longitudinal opening defined by said two parallel legs of said second horizontal frame member.

7. The electrical enclosure of claim 6, wherein wire terminating devices can be mounted on said web of said second horizontal-frame-member.

8. The electrical enclosure of claim 1, wherein said first and second dedicated wiring compartments are configured such that said first and second dedicated wiring compartments of multiple electrical enclosures installed immediately adjacent one another are connectable, thereby providing a continuous dedicated wiring compartment extending along a front surface from one terminating side of the multiple enclosure installation to the other terminating side of the multiple enclosure installation.

9. The electrical enclosure of claim 1, wherein closing plates are provided at each terminating end of said first and second dedicated wiring compartments.

10. An electrical enclosure having front accessible wiring compartments, said enclosure comprising:
    a front surface intermediate two parallel sides;
    a first wiring compartment extending horizontally between said two parallel sides along said front surface;
    a second wiring compartment extending horizontally between said two parallel sides along said front surface.

11. The enclosure of claim 10, wherein said first wiring compartment extends along the uppermost edge of said front surface and said second wiring compartment extends along the lowermost edge of said front surface.

12. The enclosure of claim 10, wherein said first and second wiring compartments are significantly defined by horizontal frame members of the electrical enclosure.

13. An electrical enclosure having dedicated wiring compartments, said enclosure comprising:
    a structural frame supporting the enclosure;
    an upper horizontal-frame-member extending along the top of the enclosure and intermediate two generally parallel side walls of the enclosure, said upper horizontal-frame-member defining a portion of an upper dedicated wiring compartment;
    a lower horizontal-frame-member extending along the bottom of the enclosure and intermediate said two generally parallel side walls of the enclosure, said lower horizontal-frame-member defining a lower dedicated wiring compartment.

14. The electrical enclosure of claim 13, wherein said upper and lower horizontal-frame-members are generally U-shaped in cross-section such as to define a web intermediate two generally parallel legs, said upper and lower horizontal-frame-members being positioned such that said webs lie in a generally vertical plane and said parallel legs extend toward a front of the electrical enclosure, said webs of said upper and lower horizontal frame members defining a wall between the interior of the electrical enclosure and said upper and lower dedicated wiring compartments respectively, each said web further defining openings for the passage of wiring from within the enclosure into said upper or lower dedicated wiring compartment.

15. The enclosure of claim 14, wherein factory wiring of electrical devices enclosed within the electrical enclosure is pre-terminated on wiring terminals attachable to an inside surface of said upper and lower dedicated wiring compartments.

* * * * *